United States Patent [19]

Myers

[11] 3,736,736

[45] June 5, 1973

[54] BALING ATTACHMENT FOR LAWN MOWERS

[75] Inventor: Herbert Arthur Myers, Coal Valley, Ill.

[73] Assignee: Deere & Company, Moline, Ill.

[22] Filed: Mar. 6, 1972

[21] Appl. No.: 231,890

[52] U.S. Cl. ............... 56/14.5, 56/16.6, 56/202, 15/78
[51] Int. Cl. ............................................. A01d 14/02
[58] Field of Search .................... 56/202, 341, 12.7, 56/16.6, 16.7, 17.5, 14.5; 15/21 R, 78, 82–86

[56] References Cited

UNITED STATES PATENTS 3,222,853  12/1965  Michael .............................. 56/202
3,641,754  2/1972  Anstee ................................ 56/341

Primary Examiner—Russell R. Kinsey
Attorney—H. Vincent Harsha, Harold M. Knoth, William A. Murray et al.

[57] ABSTRACT

A lawn and garden type tractor has a belly-mounted rotary lawn mower with a side discharge opening communicating with the forward end of a generally fore-and-aft tubular auger housing. An auger is journaled in the housing and is rotated by a drive connected to and driven by the mower drive, so that it moves material discharged by the mower unit through the rearward open end of the auger housing and into a relatively large enclosure supported alongside the rear wheel of the tractor. The material can be compressed directly into the enclosure, which can be dumped, or it can be compressed into a plastic bag or liner mounted within the enclosure with its open end over the outlet end of the auger housing, the bags, or liners being removable from the enclosure when they are filled with the compacted material.

27 Claims, 8 Drawing Figures

PATENTED JUN 5 1973 3,736,736

BALING ATTACHMENT FOR LAWN MOWERS

BACKGROUND OF THE INVENTION

This invention relates to an attachment for a rotary lawn mower or the like for collecting and compacting leaves and grass clippings discharged by the mower.

The disposal of grass clippings and leaves has become a major problem in the care of today's lawns, particularly in residential areas. As is well known, the increasing use of fertilizers and chemicals on lawns has resulted in thicker, more luxurious lawns. To maintain such lawns, it has become increasingly the practice to remove the grass clippings, usually with a grass catching bag over the mower outlet. However, such bags require frequent emptying, particularly when the growth is heavy, which has made the collection of the clippings a time-consuming and laborious job. In addition, in many areas, the clippings have to be bagged in order that they may be collected by a refuse collector, and the bagging of the clippings has increased the time and labor involved.

The problem of leaf disposal is also becoming increasingly acute. Traditionally, leaves have been disposed of by burning, but with the increasing concern for air pollution, burning is no longer permissable in many areas. Although some governmental units will pick up leaves, many require that the leaves be bagged, which, again, is a time-consuming and laborious task, particularly for home owners with a large number of trees.

To overcome the above problems, a relatively few machines have been proposed for baling grass clippings and leaves, although generally, such machines have been single-purpose machines and too expensive for the average home owner, or have had functional deficiencies.

SUMMARY OF THE INVENTION

According to the present invention, there is provided an improved attachment for a lawn mower or the like for compacting leaves or grass clippings into a bag or other suitable container, thereby accomplishing the threefold job of collecting, compacting, and packaging such material in one operation.

More particularly, an improved auger-type compactor is provided in association with the discharge of a rotary lawn mower for compacting leaves or grass clippings discharged from the mower into a dumpable container or a disposable bag lining the container.

An important feature of the invention resides in the fact that because of the compaction the container has a relatively large capacity, decreasing the frequency between changes of the bag or dumping of the container.

Another feature of the invention resides in the fact that the material can be compacted into a plastic bag of the type that is widely available and conventionally used for lining garbage cans or for disposing of leaves and grass clippings collected in the conventional manner. Alternately, the material can be compacted into a relatively long plastic tubing which is stored on the machine and which can be clamped and removed in sections after the individual sections are filled.

The material can also be compacted directly into a relatively large enclosure or container, which can be dumped at some suitable location while still supported on the traction vehicle, or alternately removed and hand carried for dumping in the desired location.

Still another feature of the invention resides in the provision of means for supporting the attachment on the traction unit from which the mower is suspended, such as a lawn and garden tractor or a riding mower, without unduly decreasing the stability or maneuverability of the traction vehicle.

Also according to the invention, improved drive means are provided for driving the auger. More specifically, a belt drive is provided to drive the auger directly from one of the mower blade shafts, and also a slip clutch is provided in the drive to disconnect the drive at a predetermined torque level, which is achieved after the material is compacted to a predetermined degree. Further, means are provided for adjusting the level at which the clutch slips, so that the amount of compaction of the material can be varied. The slip clutch can be readily heard when slipping, thereby providing an audible signal when the desired degree of compaction is reached.

Still another feature of the invention resides in the provision of an improved auger for compacting the material. More particularly, longitudinally extending stripper bars are provided in the auger housing, the stripper bars both journaling the auger and stripping material therefrom at the auger periphery.

DESCRIPTION OF THE PREFERRED EMBODIMENT

Figure 1:
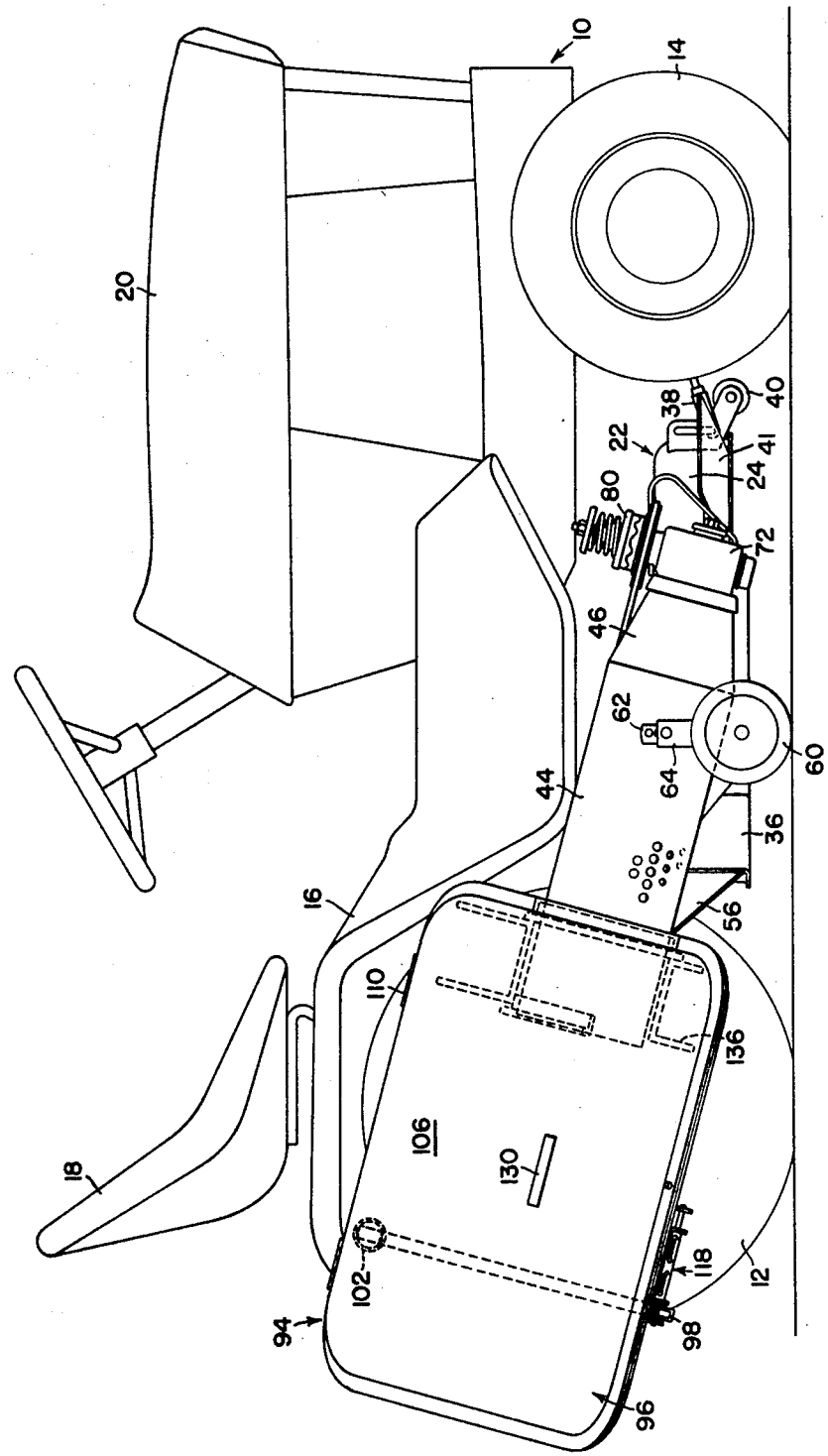
FIG. 1 is a side elevation of the improved baling attachment mounted on a lawn and garden tractor having a belly-mounted rotary mower, the enclosure portion of the device being shown in its forward position to accommodate a supply of continuous tubing.

The baling attachment for leaves and grass clippings is shown in association with a combination lawn and garden tractor and mower. The lawn and garden tractor has a main frame 10 mounted on a pair of rear drive wheels 12 and steerable front wheels 14, as is conventional. The main frame 10 includes a generally horizontal rear deck structure 16, which overlies the transmission and other conventional drive components, the outer rear portions of the deck overlying the rear wheels 12 and functioning as fenders. Mounted on top of the deck 16 over the rear axle is an operator's seat 18, the feed of the seated operator being supported on the forward portion of the deck 16. As is conventional, the tractor has an internal combustion engine (not shown) mounted within the usual engine enclosure 20.

Figure 2:
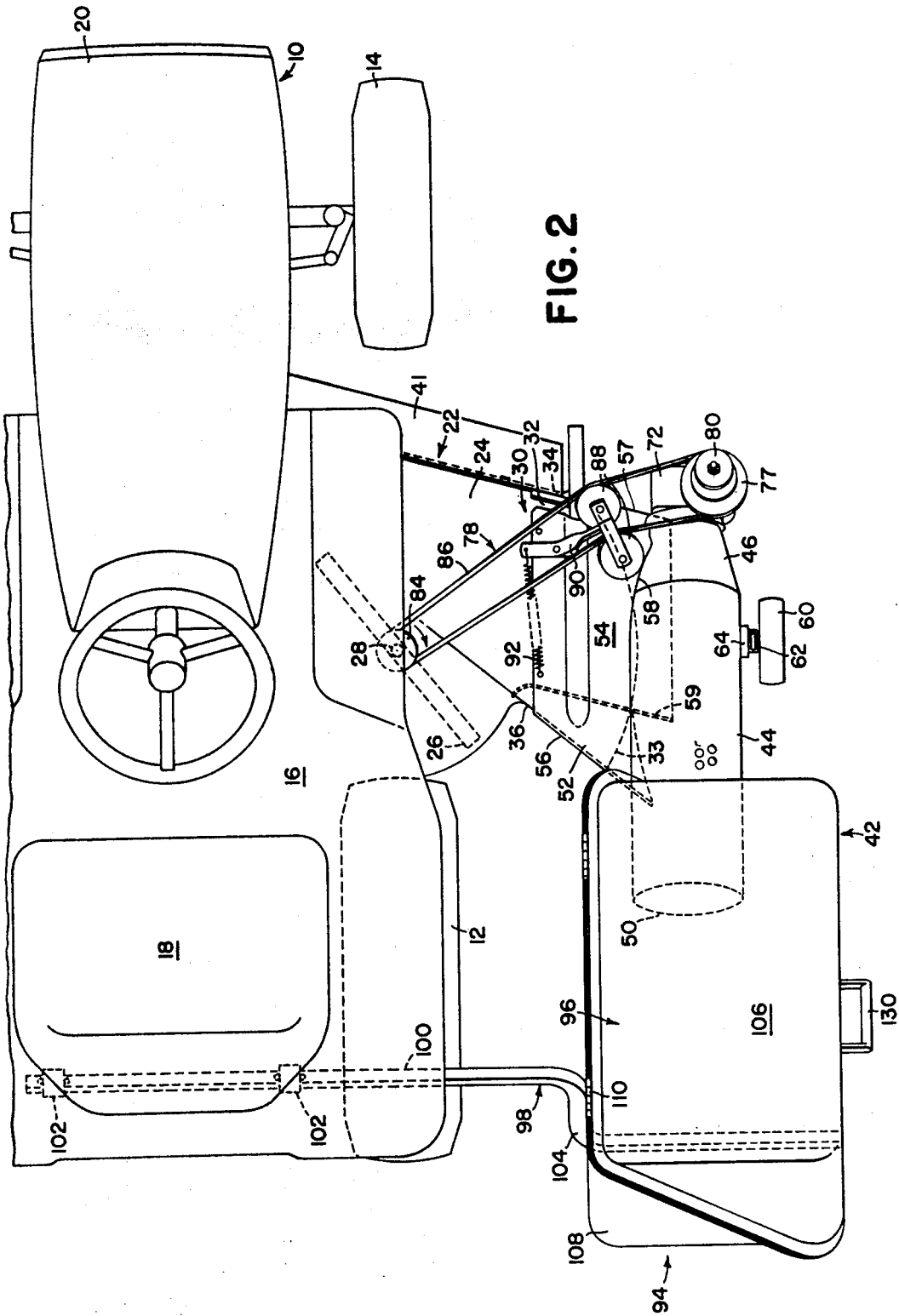
FIG. 2 is a plan view of the right side of the tractor and the baling attachment carried thereby.

A rotary mower, indicated in its entirety by the numeral 25, is suspended from the tractor main frame 10 between the front and rear wheels 14 and 12. The mower is of well known construction and includes a generally horizontal housing or mower deck 24 having an open bottom. Three rotary blades 26 are respectively mounted on vertical shafts 28 journaled in the housing, only the right-hand blade 26 and shaft 28 being shown in the drawing, since the construction of such mowers is well known, the center blade being spaced slightly ahead of the outer blades to provide a small degree of overlap between the adjacent blades. Each blade 26 rotates in a clockwise direction, as seen in FIG. 2, the blades being driven from the engine via a conventional belt drive (not shown). As the machine advances, the rotating blades sever the grass and discharge the grass clippings tangentially to the right through a discharge chute 30 which extends from the right side of the mower deck 24. As is well known, the rotating blades are formed to provide suction so that they will pick up material such as leaves and impell them through the discharge chute 30. The lift due to the rotating blades causing the material to generally flow along the underside of the top of the mower deck. The laterally extending portion of the discharge chute 30 is formed by a generally horizontal top wall 32, having an arcuate outer edge 33, and depending front and rear walls 34 and 36, respectively, the discharge chute like the mower deck being open toward the bottom. The mower is suspended from the tractor main frame 10 in a known manner by a suspension linkage 38, only a portion of which was shown. An anti-scalping roller 40 is provided at the front of the mower deck, and the rear portion of the deck is conventionally supported on gauge wheels (not shown) which control the height of the cut. An elongated transversely extending plate 41 is removably attached to the front wall of the mower deck and is inclined upwardly and forwardly from the lower edge of the mower deck front wall. The plate 41 extends the width of the mower and directs leaves or the like under the front of the mower deck when the mower is operated in a heavy accumulation of material, so that the material is not pushed ahead of the mower.

Mounted on the discharge chute and on the tractor main frame 10 and extending in a fore-and-aft direction alongside the tractor, is a baling attachment, indicated in its entirety by the numeral 42. The baling attachment 42 includes a tubular auger housing 44 extending in a generally fore-and-aft direction adjacent to the discharge chute, the auger housing being tilted so that it extends slightly upwardly and rearwardly. The housing 44 is preferably made of perforated metal, which permits the escape of air in the housing, it being necessary that at least the forward portion of the auger housing be perforated to allow the substantially unhindered flow of air through the discharge chute and housing while collecting most of the material entrained in the air. The housing has a neck or tapered portion 46 at its forward end, which is closed, and an inlet opening 48 is provided in the side wall of the housing 44 immediately behind the forward end of the housing. A rearward or outlet end 50 of the housing 44 is open.

As is apparent, the inlet opening 48 extends approximately one-half the length of the auger housing 44 and communicates with the mower discharge. An adapter member 52 connects the auger housing 44 to the discharge chute 30 and helps to direct material discharged by the mower into the inlet opening 48. The adapter member 52 overlies the discharge chute 30 and includes a top wall 54 removably attached to the top wall 32 of the discharge chute and rear and front walls 56 and 57, respectively, which respectively overlap and extend outwardly from the rear wall 36 and front wall 34 of the discharge chute. The outer end of the adapter member is preferably welded to the auger housing 44, the outer edge 58 of the top wall 54 being curved to conform to the curve of the auger housing. As is apparent, the rearward portion of the edge 58 is attached to the lower portion of the auger housing, while the forward portion of the edge 58 joins the auger housing at the upper edge of the housing inlet opening 48. A vertical baffle 59 is removably attached to the underside of the discharge chute top wall 32 and extends laterally outwardly within the discharge chute 30 to confine the mower discharge, the outer end of the baffle 59 being curved and attached to the auger housing 44 at the rear edge of the inlet opening 48. Both the adapter member 52 and the baffle 59 are removably secured to the discharge chute 30 by means of appropriate fasteners to permit easy installation and removal of the baling attachment 42.

A gauge wheel 60 is journaled in a vertical arm 62, which is vertically adjustable in a mounting bracket 64 attached to the outer wall of the auger housing 44, the vertically adjustable gauge wheel being selectively mounted in different vertical positions in the same manner as the gauge wheels on the mower and functioning to provide additional support for the baling attachment 42.

Figure 4:
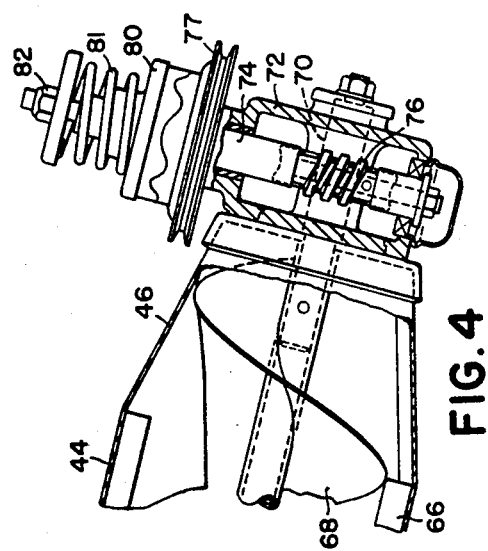
FIG. 4 is an enlarged section of the forward end of the auger, showing a portion of the auger drive and the slip clutch therein.

Four longitudinally extending stripper bars 66 are disposed at 90° intervals around the interior of the auger housing 44 and extend the length of the auger housing rearwardly of the tapered portion 46. The stripper bars 66 are preferably made of nylon or the like, and journal the outer end of an auger 68 mounted in and extending the length of the auger housing 44. The bars also function to strip material from the periphery of the auger as the auger rotates. The forward end of the auger is tapered to conform to the tapered housing portion 46, and, as best seen in FIG. 4, the forward end of the auger is provided with a shaft extension 70, which extends through the front end of the auger housing and into a drive housing 72 mounted on the forward end of the auger housing. A second shaft 74 is journaled in the housing 72 at right angles and offset from the shaft 70 and worm gearing 76 drivingly connects the shaft 74 to the auger shaft extension 70.

An output sheave 77 of a belt drive 78 is journaled on the shaft 74 above the housing 72 and drives the shaft 74 through a slip clutch 80. The amount of torque transmitted through the slip clutch 80 can be selectively varied by adjusting the preload on a clutch spring 81 by means of an adjustable nut 82 on top of the slip clutch.

The belt drive 78 includes a drive sheave 84 mounted on the right-hand mower blade shaft 28 and drivingly connected to the sheave 77 by a belt 86, the opposite runs of which engage a pair of idler sheaves 88 mounted on a swingable arm 90 pivotally carried on top of the adapter member 52, the idler sheaves 88 being biased into engagement with the belt 86 by a tension spring 92. As is apparent, the above represents a relatively simple driving arrangement for powering the baling attachment from the mower drive. Of course, other types of drives could be used, such as a hydraulic motor powered by the tractor hydraulic system, or an electric motor in the case of a battery-powered tractor-mower.

The auger 68 moves the material impelled through the inlet opening 48 by the mower 22 rearwardly through the outlet 50 and compacts it into a container means, indicated in its entirety by the numeral 94. The container means 94 includes a box-like enclosure or housing 96 supported alongside the right rear wheel 12 by means of a support arm 98 extending laterally from the tractor main frame 10. The support arm includes a transversely extending inner portion 100 connected to the underside of the deck 16 below the rearward portion of the seat 18 by means of a pair of brackets 102, the support arm 98 being rockable in the brackets to permit fore-and-aft adjustment of the enclosure 96 and also being laterally extendable to accommodate different size mowers. The support arm 98 also includes an L-shaped outer portion 104, the upright leg of which engages the inner wall of the enclosure while the horizontal leg engages the bottom of the enclosure.

Figure 6:
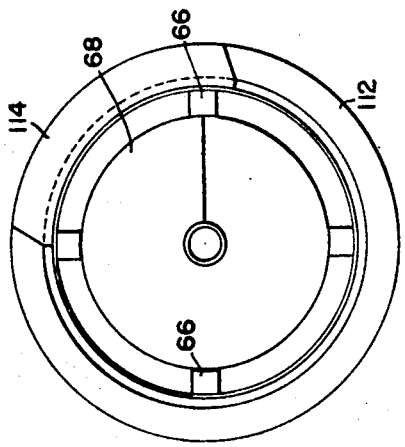
FIG. 6 is an end view of the auger housing viewed generally along the line 6—6 of FIG. 3.
Figure 5:
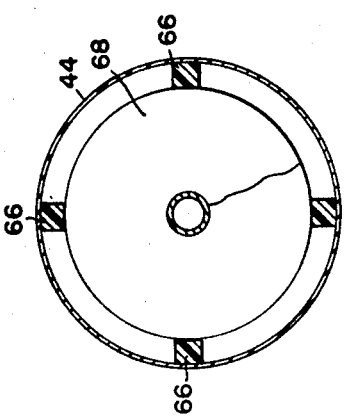
FIG. 5 is a section of the auger viewed generally along the line 5—5 of FIG. 3.

As is apparent, the enclosure 96 is split along a fore-and-aft extending downwardly and outwardly inclined plane extending from the upper and inner edge to the lower and outer edge into a top or door half 106 and a bottom half 108, which are interconnected by fore-and-aft extending hinges 110 along the inner upper edge of the enclosure. As is apparent, the auger housing 44 extends rearwardly through an opening 111 in the front wall of the enclosure 96, the opening being generally circular and partly formed in both the door and bottom halves. An annular flange 112 encircles the auger housing 44 forwardly of the rearward end of the housing, while a second flange 114 is mounted on the rearward end of the auger housing, the second flange 114 extending only approximately 90° around the upper and outer portion of the auger housing, as best seen in FIG. 6. When the door half of the enclosure is in its closed position, as shown in full lines in FIG. 8, the opening 111 is smaller than either flange 112 or 114, so that the enclosure is restrained from rearward movement by the flanges when the door half is closed, while opening the door permits the opening to clear the flanges.

Figure 3:
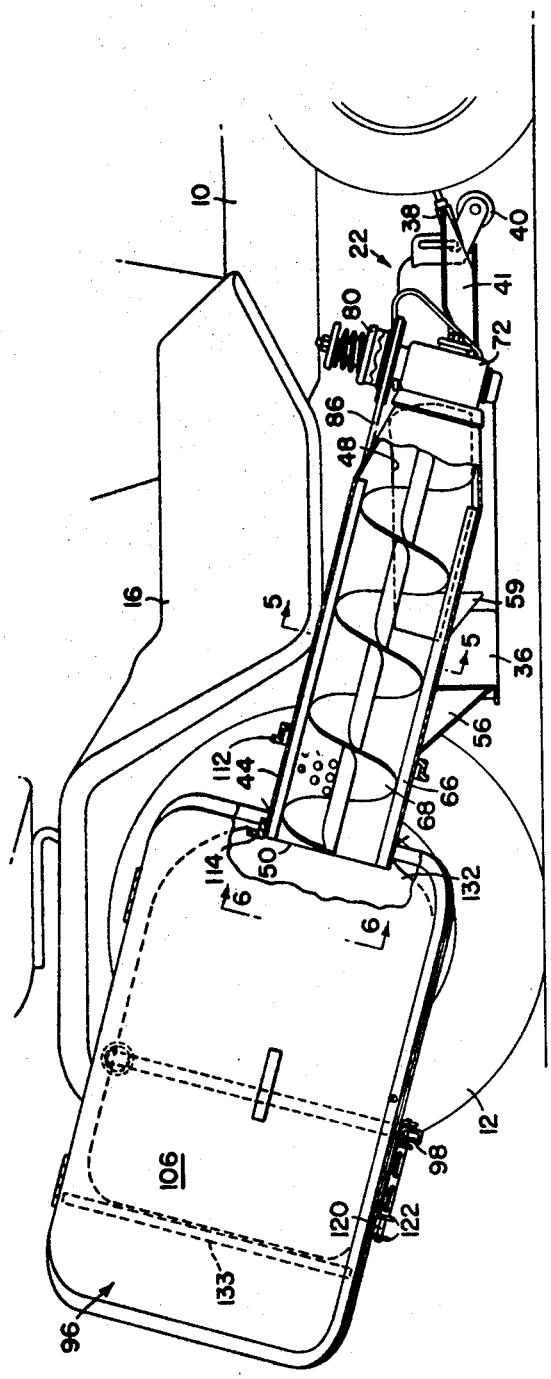
FIG. 3 is a partial side elevation view similar to FIG. 1, showing the auger portion of the baling attachment in section, with the enclosure disposed in its rearward position wherein it accommodates a single bag.
Figure 7:
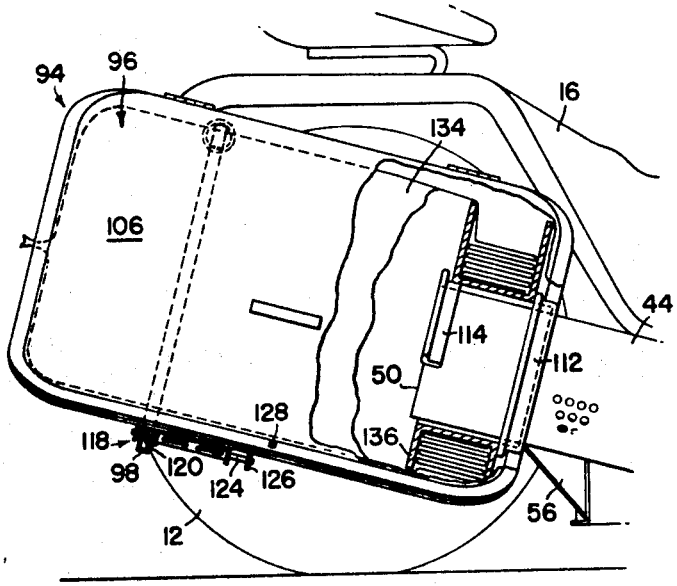
FIG. 7 is an elevation view of the enclosure portion of the baling attachment as seen in FIG. 1, with a portion of the enclosure removed to show the cartridge of continuous tubing in section.
Figure 8:
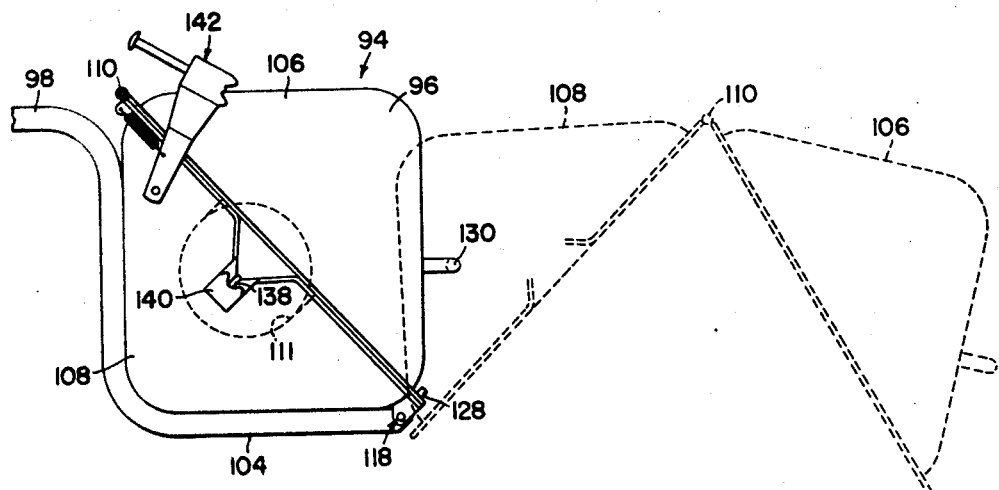
FIG. 8 is a rear end view of the enclosure, with the dump position of the enclosure shown in dotted lines.

The enclosure 96 is connected to the support arm 98 only by a pivot 118 at the outer end of the support arm and the lower and outer edge of the enclosure, so that the enclosure can be swung outwardly to a dump position, shown in dotted lines in FIG. 8, after the door half is raised and the entire closure is shifted rearwardly to clear the auger housing 44. The enclosure 96 is connected to the support arm in either a forward position, as illustrated in FIGS. 1 and 7, wherein the opening 111 encompasses the front flange 112, or in a rearward position, as illustrated in FIG. 3, wherein the opening 111 engages the rear flange 114. The pivot 118 is formed by a rear pivot shaft 120 extending between a pair of rear flanges 122 and through a hole in the outer end of the support arm 98, which is disposed between the flanges 122, the pivot shaft 120 being shiftable forwardly to clear the hole in the support arm, permitting the removal of the enclosure. The enclosure is alternately connected to the support arm by a front pivot shaft 124 coaxial with the rear shaft 120 and extendable between a pair of front flanges 126. As is apparent, when the enclosure is mounted in its rearward position, the front shaft extends through the hole in the support arm, which is disposed between the flanges 126, the shaft 124 being shiftable rearwardly to clear the support arm hole to similarly permit removal of the enclosure.

A latch 128 is provided at the lower outer edge of the enclosure to releasably lock the enclosure in its closed position, and a handle 130 is provided on the outer wall to facilitate dumping of the enclosure or carrying of the enclosure in the event that it is totally removed from the support arm by means of the releasable pivot 118.

The enclosure or housing 96 can be lined with a bag 132 having substantially the same size as the enclosure, the open end of the bag being gathered around the auger housing 44 and extending between the enclosure opening 111 and the flange 114. The bag 132 is preferably made of polyethylene or the like and is of the type that is readily available commercially, such bags being widely used for the disposal of grass clippings and leaves, as well as the disposal of garbage.

In operation, when the bag 132 is used, the enclosure 96 is mounted in its rearward position as shown in FIG. 3, and a bag is installed by opening the door half 106 and placing the bag opening around the auger housing outlet 50, after which the door half is closed. During a mowing operation, the mower 22 discharges the clippings through the discharge chute 30 and into the inlet opening 48 of the auger housing 44. The perforated auger housing allows the air in which the clippings are entrained to pass through the housing, while the rotating auger moves the clippings rearwardly and forces them into the bag 132. The auger 68 is able to substantially compress the clippings into the bag, and the enclosure 96 supports the bag and prevents it from bursting. It has been found that a relatively large amount of clippings can be compressed into a single bag, bags weighing in excess of 75 lbs. being readily formed, bags substantially in excess of this size generally not being desired since it would be hard to handle after removal from the enclosure, and would require extensive supporting structure on the tractor.

Of course, the greater the compression, the greater the resistance of the auger, and consequently the greater the torque required to drive the auger. The slip clutch 80 provides a means for automatically limiting the compression and consequently the weight of the bagged clippings, since the clutch can be set to slip at a predetermined torque, thereby limiting the amount of compression that the auger is able to produce. As is apparent, the maximum torque delivered to the slip clutch 80 can be adjusted by means of the adjusting nut 82, so that the weight of the bagged clippings can be varied. The slip clutch 80 is of the type that can be readily heard when slipping, thus giving an audible signal to the operator when the desired degree of compaction has been reached.

An upright partition 133 having the same configuration as the interior of the enclosure 96 can be removably installed at different fore-and-aft locations in the enclosure to vary the size of the enclosure, providing a false rearward end for the enclosure, as shown in FIG. 3. Any suitable means could be utilized for fastening the partition in its alternate positions. As is apparent, the adjustable partition provides a means for varying the size of the filled bag of material, thereby providing for adjusting the weight of the filled bags for a given degree of compaction.

Obviously, leaves and similar foreign material can be removed from the lawn and bagged in a similar manner, the mower being of the pickup type which creates a suction that raises light material from the ground and impells it through the discharge chute.

If the operator has a suitable dumping place, the bag 132 can be dispensed with, and the clippings or leaves discharged and compacted directly into the enclosure 96. In such a case, the operator preferably drives the tractor to the dumping location after the enclosure is filled, unlatches the enclosure, and after raising the door half sufficiently to clear the flange 114, the enclosure is shifted rearwardly by rocking the support arm 98 to the rear, after which the enclosure is swung outwardly about the pivot 118 to the dump position, which is shown in dotted lines in FIG. 8. If the operator prefers to hand carry the enclosure 96 to the dumping location, the enclosure can similarly be shifted to clear the flange 114, after which the pivot 118 is removed by sliding the shaft 124 to the rear, whereupon the enclosure can be latched again and removed via the handle 130.

The baling attachment 42 can also be adapted to stuff the grass clippings or the like into sections of polyethylene tubing 134, as best shown in FIG. 7. The tubing 134 is folded and wound on an annular cartridge or reel 136 in such a manner that it feeds in an axial direction over the end of the reel. This type of wound tubing has recently become available and is known as "radially wound" tubing. As shown in FIG. 7, the reel 136 is mounted on the end of the auger housing 44 between the front and rear flanges 112 and 114, and the enclosure 96 is shifted to its forward position wherein it is connected to the support arm 98 by the pivot shaft 120 to accommodate the reel 136 within the enclosure.

In operation, the reel 136 is placed on the auger housing 44 within the enclosure, the flange 114 being removably attached to the auger housing to permit the mounting of the reel 136 between the flanges 112 and 114. The tubing 134 is pulled off of the reel toward the rear, and the end of the tubing is gathered and pulled through a relatively small opening 138 in the rear wall of the enclosure 96, the opening being between the door and bottom halves of the enclosure, as shown in FIG. 8. An anvil 140 is mounted on the rear wall of the enclosure adjacent to the opening 138 and cooperates with a stapler mechanism 142, which is pivotally mounted on the bottom half 108 of the enclosure and swingable into a position wherein it is adapted to staple or clamp the end of the tubing projecting through the opening 138. Such stapler or clamping mechanisms 142 are well known, and commercially available. Obviously, the clamping or stapling mechanism could be held and manually actuated by the operator, rather than mounted on the enclosure as illustrated.

After the tubing is clamped, the clippings or leaves are stuffed into the tubing as previously described, and when the enclosure is filled, the door half is opened and the filled section of tubing is removed. As the filled section is removed, it is pulled to the rear, feeding additional tubing off the reel 136, and the filled section of tubing is placed immediately to the rear of the enclosure with the tubing immediately forward of the filled section gathered and inserted in the opening 138. The tubing is then stapled or clamped at the opening 138 at two closely-spaced locations, and the tubing is then cut between the two clamps to permit removal of the filled section of tubing. An additional section of tubing is then automatically disposed for filling in the same manner as previously described, while the filled and separated section can be removed.

I claim:

1. In a mower having a rotary cutting element rotating in a mower housing and adapted to remove material from the ground, and impel it through a discharge opening in the housing, the improvement comprising: a generally tubular auger housing having an inlet opening communicating with the discharge opening and an open outlet end; a container means operatively associated with the outlet end to receive material moving therefrom; an auger coaxially mounted within the auger housing and adapted to move the material from the inlet opening through the outlet end and to compress the material into said container means; and a plurality of stripper bars mounted in the interior of the auger housing generally parallel the axis of the auger and engageable with the auger periphery to strip the material therefrom.

2. The invention defined in claim 1 wherein the stripper bars rotatably support the discharge end of the auger.

3. The invention defined in claim 1 wherein the container means includes a retainer housing and a disposable bag removably mounted within the retainer housing with the bag opening over the auger housing outlet end to receive material therefrom.

4. In a harvester including a tractor having a mobile main frame, a power source and a rotary mower suspended from the frame and including a housing having a discharge opening and a rotary element adapted to impel material collected from the ground through the discharge opening, the improvement comprising: a generally tubular auger housing having an inlet opening communicating with the mower discharge opening and an open outlet end; a bag holder; means for supporting the bag holder on the vehicle; a bag means removably supported in the holder with its opening over the open outlet end of the auger housing; an auger journaled in the auger housing and extending from the housing opening to the outlet end; and drive means drivingly connecting the power source to the auger, so that the auger conveys material received from the mower discharge opening through the outlet and compresses it into the bag means.

5. The invention defined in claim 4 wherein the bag holder comprises an enclosure adapted to enclose the bag means and including a door means operable to permit removal of the bag means.

6. The invention defined in claim 5 wherein the auger housing extends in a generally fore-and-aft direction alongside the tractor and the means for supporting the bag holder comprises an arm connected to and extending laterally from a rearward portion of the tractor main frame and supporting the bag holder alongside the tractor.

7. The invention defined in claim 6 wherein the tractor includes front and rear wheels and the mower is suspended from the tractor between the front and rear wheels and discharges the material laterally through the auger housing inlet opening in a side wall of the auger housing.

8. The invention defined in claim 4 wherein the mower is driven from a power source through a first belt drive and the auger drive means includes a second belt drive drivingly connecting the first belt drive to the auger.

9. The invention defined in claim 8 wherein the drive means includes a slip clutch adapted to disconnect the drive to the auger when the drive torque exceeds a predetermined value.

10. In a lawn care device having a housing with a discharge opening and means for removing material from the ground and impelling it through the discharge opening, the improvement comprising: a generally tubular auger housing having an inlet opening communicating with the discharge opening and an open outlet end; a rigid enclosure having a generally circular opening substantially conforming to and receiving the open outlet end of the auger housing; and an auger mounted within the auger housing and adapted to move material from the inlet opening and compress it through the open outlet end into the enclosure.

11. The invention defined in claim 10 and including a disposable bag removably mounted within the enclosure with the bag opening over the open outlet end of the auger housing, the enclosure confining and retaining the bag on the auger housing and including door means operable to permit removal of the bag when filled with compressed material.

12. The invention defined in claim 10 and including an annular cartridge of flexible, tubular material coaxially mounted on the auger housing adjacent the open outlet end and adapted to dispense an elongated tubular casing within the enclosure and over the outlet end, the casing being closeable and dispensable in increments to form successive liners for the enclosure adapted to receive the compressed material from the outlet end of the auger housing.

13. The invention defined in claim 10 wherein the lawn care device includes a mobile main frame and including means for supporting the enclosure on the main frame with the auger housing received in said opening and permitting shifting of the enclosure in an axial direction relative to the auger housing to an alternate position wherein it clears the housing.

14. In a lawn care device having means for removing material from the ground and moving it through a discharge opening, the improvement comprising: a first housing having an inlet opening communicating with the discharge opening and a generally cylindrical axial outlet opening; means for moving material from the inlet opening and through the outlet opening; a retainer housing connected to the first housing adjacent the outlet opening; an annular cartridge of flexible tubular material coaxially mounted on the cylindrical portion of the said first housing and adapted to dispense an elongated tubular casing over and in communication with the outlet opening, the casing being supported on said retainer housing adjacent to the outlet opening and adapted to receive material from the outlet opening; and means for clamping the casing at intervals so that material received within the casing can be retained between adjacent clamps and the filled and clamped sections of the casing can be removed.

15. The invention defined in claim 14 wherein the first housing is tubular and the means for moving the material through the outlet opening comprises an auger journaled in said tubular housing and means for rotating the auger.

16. The invention defined in claim 15 wherein the retainer housing is formed by an enclosure having a generally circular opening which coaxially receives the first housing, the cartridge of tubular material being disposed within the enclosure so that the casing liner in the enclosure is supported thereby.

17. The invention defined in claim 16 wherein the enclosure has an end wall opposite the outlet opening and provided with an opening through which the casing is gathered and extends, the clamping means being adapted to clamp the gathered portion of the casing adjacent to said opening.

18. In a lawn care device having a mobile main frame which carries means for removing material from the ground and moving it through a discharge opening, the improvement comprising: a generally tubular auger housing having an inlet opening communicating with the discharge opening and an open outlet end; an auger mounted in the auger housing and operative to move material from the inlet opening and through the open outlet end; a substantially rigid enclosure having an inlet opening communicating with the open outlet end of the auger housing and a door means; means for supporting the enclosure on the main frame for shifting between a collecting position wherein it is adapted to receive material from the auger and a dump position wherein it is adapted to dump material through the door means.

19. The invention defined in claim 18 wherein the auger housing extends in a generally fore-and-aft direction alongside the main frame and has a rearward outlet end received in a generally circular inlet opening in the enclosure, the supporting means including a generally fore-and-aft pivot about which the enclosure swings between its collecting and dump positions.

20. The invention defined in claim 19 wherein the support means also includes means for supporting the enclosure in a forward position wherein the circular inlet opening encompasses the auger housing and a rearward position wherein the enclosure clears the auger housing to permit said lateral swinging to the dump position.

21. In a lawn care device having a mobile main frame which carries means for removing material from the ground and moving it through a discharge opening, the improvement comprising: a generally tubular auger housing having an inlet opening communicating with the discharge opening and an open outlet end; an auger mounted in the auger housing and operative to move material from the inlet opening and through the open outlet end; a bag holder having a circular opening adapted to receive the auger housing; and means for supporting the bag holder on the main frame and operative to permit shifting of the bag holder between a first position wherein the circular opening encompasses the auger housing immediately adjacent to the open outlet end and a second position wherein the opening encompasses the auger housing at a location spaced from the open outlet end.

22. The invention defined in claim 21 and including an annular cartridge of flexible casing coaxially mounted on the auger housing between the circular opening and the outlet end of the housing when the bag holder is in its second position.

23. In a vehicle unit having a mobile main frame, a power source, a rotary mower suspended from the main frame and including a generally horizontal housing having a discharge opening, and at least one rotary blade having a vertical shaft journaled in the housing and a belt drive drivingly connecting the shaft to the power source, the improvement comprising: a generally tubular auger housing having an inlet opening communicating with the mower discharge opening and an open outlet end; a container means operatively associated with the outlet end to receive material therefrom; an auger coaxially journaled within the auger housing and having a shaft; a belt drive means including an input pulley on the mower blade shaft, an output pulley operatively connected to the auger shaft, and a belt drivingly connecting the input pulley to the output pulley.

24. The invention defined in claim 23 wherein the output shaft is connected to the auger shaft by a slip clutch means operative to disconnect the drive means when the torque required by the auger exceeds a predetermined amount.

25. In a mower having a power source and a rotary cutting element rotating in a mower housing and adapted to remove material from the ground, and impel it through a discharge opening in the housing, the improvement comprising: a generally tubular auger housing having an inlet opening communicating with the discharge opening and an open outlet end; a container means operatively associated with the outlet end to receive material moving therefrom; an auger coaxially mounted within the auger housing and adapted to move the material from the inlet opening through the outlet end and to compress the material into said container means; and a drive means operatively connecting the auger to the power source for rotating the auger and including a slip clutch means operative to slip and disconnect the drive means when the material in the container means reaches a level of compaction at which the torque required by the auger exceeds a predetermined amount, the slip clutch means producing an audible noise when slipping to signal that said level of compaction has been reached.

26. The invention defined in claim 25 wherein the drive means is a belt drive and includes an output pulley drivingly connected to an input element of the slip clutch, an output element of the slip clutch being drivingly connected to the auger.

27. In a vehicle having a mobile main frame and a power source, the improvement comprising: a mower unit suspended from the main frame and including a generally horizontal housing, having an open bottom, an upright front wall and a discharge opening, a blade means rotating with the housing, and a transversely elongated plate mounted on the front wall of the housing, substantially spanning the swath cut by the mower unit, and extending forwardly and upwardly from the lower edge of the front wall for preventing a buildup of material in front of the front wall as the vehicle advances; a generally tubular auger housing having an inlet opening, communicating with the discharge opening, and an open outlet end; a container means operatively associated with the outlet end to receive material moving therefrom; and an auger coaxially mounted within the auger housing and adapted to move the material from the inlet opening through the outlet end and to compress the material into said container means.

* * * * *